May 1, 1928.

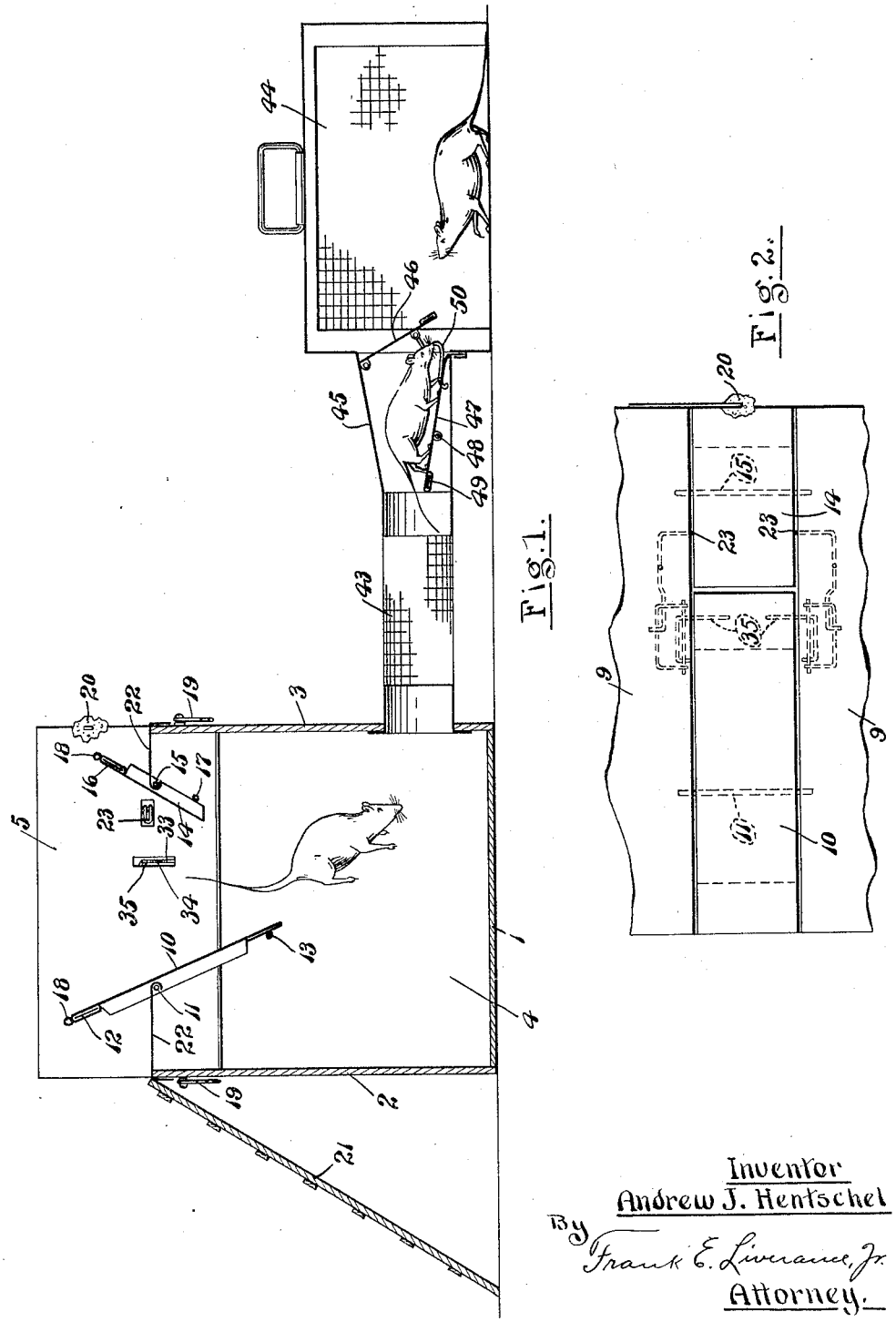

A. J. HENTSCHEL 1,668,367

TRAP

Filed July 20, 1925

Inventor
Andrew J. Hentschel
By Frank E. Liverance, Jr.
Attorney.

May 1, 1928.
A. J. HENTSCHEL
1,668,367
TRAP
Filed July 20, 1925   3 Sheets-Sheet 3
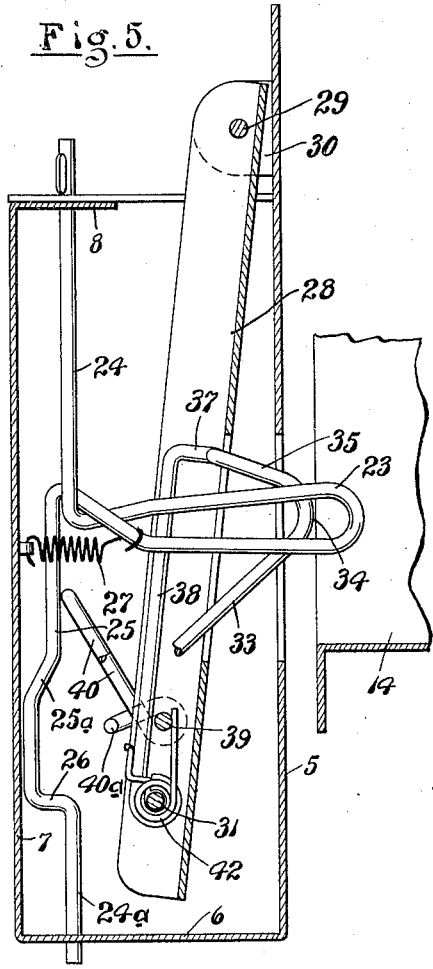
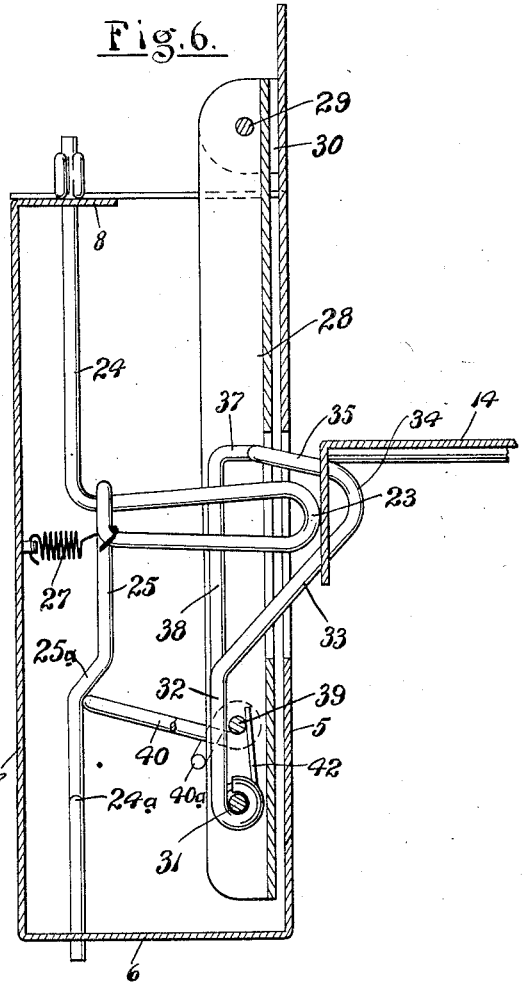
Inventor
Andrew J. Hentschel
By Frank E. Liverance, Jr.
Attorney Patented May 1, 1928.

1,668,367

UNITED STATES PATENT OFFICE.

ANDREW J. HENTSCHEL, OF GRAND RAPIDS, MICHIGAN.

TRAP.

Application filed July 20, 1925. Serial No. 44,715.

This invention relates to a trap particularly designed for catching rats or mice. It is a primary object and purpose of the present invention to provide a trap wherein rodents may be caught, the trap being self setting so that after one is caught it is immediately returned to set position and ready for the next. Coupled with the trap is a cage to which the rats or mice caught may go, equipped with a door which prevents their return to the trap.

The construction for effectively attaining these ends is fully described in the following description and shown in the accompanying drawings, in which, Fig. 1 is a longitudinal section through the assembled trap and cage.

Fig. 2 is a fragmentary plan of the trap.

Fig. 5 is a transverse vertical section through the construction shown in Fig. 4 showing the position of the parts after the trap has been sprung or tripped.

Fig. 6 is a like view illustrating the parts in set position, and

Fig. 7 is a fragmentary horizontal section through the construction shown in Fig. 6.

Like reference characters refer to like parts in the different figures of the drawings.

Figure 4:
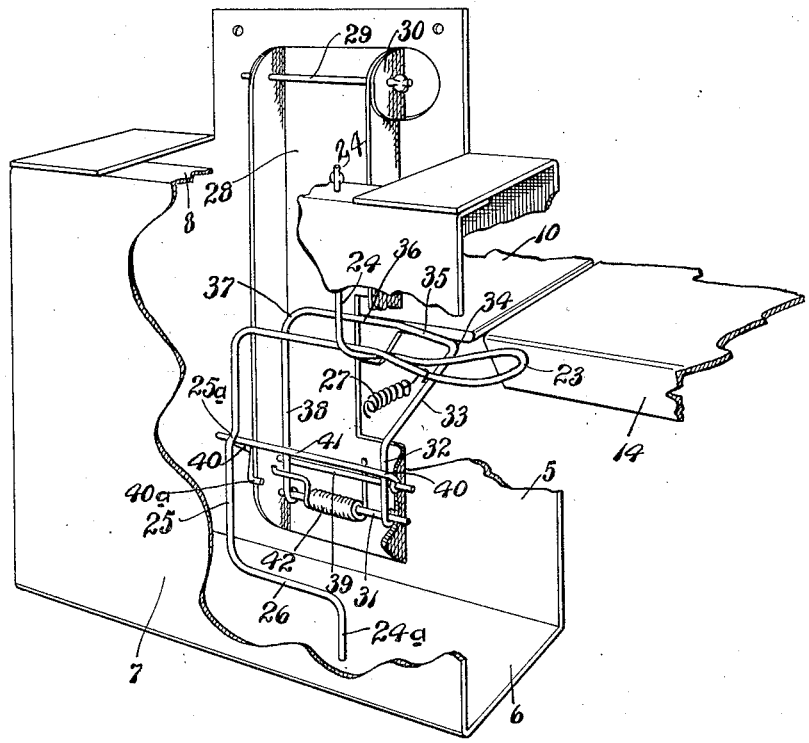
Fig. 4 is a fragmentary perspective view with parts broken away and in section to disclose the mechanism, showing the trap mechanism whereby the platforms are held in horizontal position until pressure is applied to the free end of one of said platforms.

In the construction of the trap an enclosure is provided having a bottom 1, vertical spaced apart ends 2 and 3 and sides 4. Above the upper edges of the sides 4 housings are located each including a vertical inner side 5, turned outwardly at their lower edges to provide a bottom 6 and then turned upwardly to make the outer side 7 paralleling the inner side 5. These sides 7 of the housings at their upper edges are formed with inturned flanges 8 connected in any suitable manner with the inner sides 5. In practice the inner sides 5 may be turned outwardly and continued over the housing thus made, as indicated at 9 in Fig. 2, and may thence be turned downwardly and connected with the base 1 so as to make a relatively heavy and substantial structure which will not overturn readily.

Figure 3:
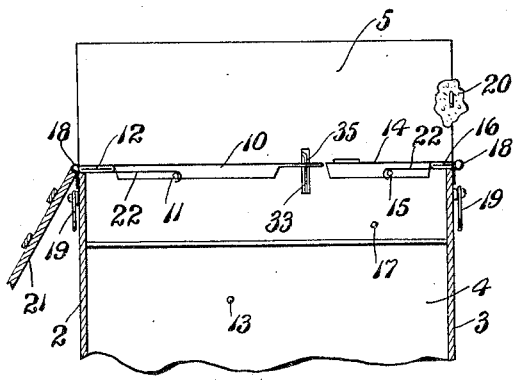
Fig. 3 is a vertical section through the upper portion of the trap showing the same in set position.

At the upper edge of the front end 2 a platform 10 is pivotally mounted to turn on a horizontal axis on the rod 11 located between the inner sides 5 of the two housings described. This platform is weighted at its outer end, as indicated at 12, so that normally it will occupy a horizontal position when free to do so. The downward movement of the inner end of the platform is limited by a stop rod 13, shown in Figs. 1 and 3. This platform in horizontal position extends better than half of the distance between the ends 2 and 3.

A second shorter platform 14 is located adjacent the opposite end of the structure and is pivotally mounted on the rod 15 to turn on a horizontal axis, being likewise weighted at 16 at its outer end so that it will normally occupy an upper horizontal position. The downward movement of the inner end of the platform is likewise stopped by a rod 17. Each of the platforms 10 and 14 are equipped with eyes 18 with which hooks 19 mounted on the ends 2 and 3 may be detachably engaged so that the platforms may be held in horizontal position. This is to permit the rodents to gain access to the bait 20 which is supported adjacent the outer end of the second platform 14, whereby the rats or mice may for a time be permitted to reach the bait and become familiar with the path to such bait, after which the hooks 19 may be released, whereupon the trap will be in working order. A short ladder 21 is shown leading to the platform 10 up which the rats or mice may travel toward the bait. The space between the upper edges of the ends 2 and 3 and the pivotal rods 11 and 15 is covered by metal plates 22 so that rats or mice may not be able to scale the ends 2 and 3 and force the platforms upwardly at their outer ends and thus escape.

The platform 14 is formed at its side edges with depending flanges against which, when in its horizontal position, loops 23 formed of wire bear, the loops being formed between the ends of rock shafts 24 pivotally mounted to turn on a vertical axis between the bottoms 6 and flanges 8 of the said housings described. Each of the loops 23 at one end is continued upwardly to make the upper section of the rock shaft 24 and at the other end is extended horizontally for a distance and then downwardly making an off-set section 25 in which an inclined part 25ª is made, the wire or rod at the lower end of the section 25 being turned horizontally as indicated at 26 for a distance and then turned downwardly to pass through the bottom 6, making the lower section 24ª of the rock shaft which is in vertical alignment with the upper section 24. A light coiled spring 27 is attached to the loop 23 at one end and to the outer vertical side of the housing at its opposite end, the tendency of which is to draw the rock shaft to the position shown in Figs. 4 and 6 in which position the spring is substantially without tension.

A member 28 of sheet metal and of channel form is pivotally mounted at its upper end on a rod 29 passing through ears 30 struck from the inner side 5 of each housing. A rod or shaft 31 extends horizontally between the flanges of this member adjacent the lower end thereof on which an irregularly-shaped supporting member of wire is mounted. One end of this member is formed with an eye to pass around the rod 31 extending vertically therefrom for a short distance, as indicated at 32, and then upwardly and inwardly at an incline, as indicated at 33, to underneath the inner end of the platform 10, being bent back at 34 and thence extended inwardly and slightly upwardly at 35, until within the plane of the member 28 whereupon it is turned horizontally, making the section 36 lying within and parallel to the web of said member 28, thence turned to the rear for a short distance, as indicated at 37, and then downwardly to make the terminal vertical section 38, which at its lower end is formed with an eye through which the rod 31 passes. The flanges adjacent the inner end of the platform 10 are cut away and the platform at this end, when in its horizontal position, bears against the upper sides of the sections 35 of the two supporting members one located at each side of the platform, as is obvious.

A second horizontal rod 39 is located between the flanges of the member 28 a short distance above the rod 31. A bail having spaced apart sides 40 and an integral cross connecting member 41 is pivotally mounted on the rod 39, the end of one of the arms 40 being continued around the rod 39 and thence downwardly to the edge of one of the flanges of the member 28 and then turned inwardly as indicated at 40ª, bearing against the edge of said flange and serving as a stop to limit the downward movement of the outer free end of the bail. A torsion spring 42 is wound around the rod 31 one end thereof lying back of the upper rod 39 and the other end engaging with the part 38 previously described, the tendency of which is to move the supporting members for the platform 10 inwardly so as to bring the same under the edges of said platform. It is evident that the inner sides 5 of the housings and that the web of the channel member 28 must be provided with openings for the free passage of the loops 23 and the inwardly projecting portions of the platform supporting members.

In operation with the platforms in horizontal position and with the parts of the mechanism as shown in Fig. 4, the rat or mouse may traverse the platform 10, the same being supported by the sections 35 of the supporting members and the platform will not move from its horizontal position until the inner end of the second platform is reached. When this occurs the weight of the rat on the inner end of the platform 14 depresses the same until its upper side is below the plane of the loops 23. Prior to that time by reason of the lock made by the cross rod 41 of the bail carried on rod 39 engaging against the vertical section 25 of the rock shaft 24 at the lower end of the incline 25ª the inwardly projecting portions of the supporting member for the platform 10 are held against movement. When the loops 23 are thus released the thrust of the cross members 41 of the bails against the portion 25ª causes the member swinging on the pivot portions 24 and 24ª to move to the position shown in Fig. 5 which permits the bails to rise over the portions 25ª and the supports 35 to swing inward as shown in this figure, releasing the platform. As soon as the bails assume the upturned position shown in Fig. 5 they no longer have a tendency to thrust against the member 25 and the spring 27 tends to turn this member together with the loop 23 to normal position shown in Fig. 6 and the hinged member 28 returns by gravity to its normal position, the bails then dropping into position under the portion 25ª. When the animal has dropped free of the platforms they both return to upper position, the platform 10 springing the supports 35 inward as it passes them and the platform 14 with its downturned flanges coming into position between the loops 23 whereat the trap is again set for operation.

A tubular outlet 43 of any desired material and of any desired length may be made in an end 3 of the trap structure near its lower end so that the rats or mice may traverse the same to the cage 44 passing from the outlet 43 through an entrance member 45, the inner end of which is normally closed by a door 46 pivotally suspended from its upper end. A tilting member 47 pivotally mounted between its ends at 48 is weighted at 49 at its outer end and suitably connected by means of the member 50 with the door 46 so as to normally hold the door closed; but when the rat reaches said tilting member and turns it by its weight to the position shown in Fig. 1 the door 46 is opened permitting entrance to the cage 44. The specific details of this arrangement are of no importance in the present application, not being particularly concerned with the trap invention set forth in the remaining figures of the drawings.

In some cases it may be desirable to drown the rats as soon as they are caught and to accomplish this the structure may be slightly modified by omitting the bottom 1 of the enclosure and arranging the trap over a barrel or other receptacle of water so that the rats, after dropping through the trap doors, will fall directly into the water and drown.

In smaller and lighter structures designed to catch mice or other small animals it is not necessary to provide a locking and retaining device at each side of the structure but the trap doors or platforms may be held and tripped at one side only, The construction described is particularly efficient for the purpose for which it is designed and has so proved in practice. By it rats and mice may be caught, the trap resetting itself automatically. The invention is defined in the appended claims and is to be considered as comprehensive of all forms of structure coming within their scope.

I claim:

1. A trap comprising an enclosure having an open upper end, a main platform extending inwardly from one side of the enclosure at said upper end, a trip platform extending inwardly from the opposite side of the enclosure in alignment with the main platform, both platforms being pivotally mounted between their ends on horizontal axes, a rock shaft mounted vertically at each side of the trip platform and formed with a horizontally extending loop adapted to bear against a side of the trip platform, supporting members pivotally mounted at their lower ends and extending upwardly and having portions extending under the inner end of the main platform, means disposed between the rock shafts and said supporting members and holding the supporting members against movement so long as said loops are engaged against the sides of the trip platform, said rock shaft being freed for movement and the supporting members thereby released on depression of the inner end of the trip platform, substantially as described.

2. A trap comprising two tiltable platforms, the movable edges of which are arranged in juxtaposition, a movable supporting member extending under the first platform, a trigger member engaging a side of the second platform, and a locking member interposed between the said supporting member and the trigger member which prevents movement of the supporting member while the trigger member engages the second platform but which is released to permit movement of the supporting member to release the first platform when the trigger member is released by depression of the second platform.

3. A trap comprising two tiltable platforms having their swinging edges arranged in juxtaposition, a hinged member adjacent the first platform, a supporting extension on said hinged member extending under said first platform, a trigger member engaging the second platform and released by depression thereof, and a locking member interposed between said hinged member and said trigger member and arranged to retain the supporting extension under the first platform while the trigger is engaged by the second platform and to release the hinged member whereby its supporting extension will move from under and release the first platform when the trigger member is released by depression of the second platform.

4. A trap comprising two tiltable platforms having their swinging edges arranged in juxtaposition, a hinged member adjacent the first platform, a supporting extension movably mounted on said hinged member extending under said first platform, a trigger member engaging the second platform and released by depression thereof, and a locking member interposed between said hinged member and said trigger member and arranged to retain the supporting extension under the first platform while the trigger is engaged by the second platform and to release the hinged member whereby its supporting extension will move from under and release the first platform when the trigger member is released by depression of the second platform.

In testimony whereof I affix my signature.

ANDREW J. HENTSCHEL.